United States Patent [19]

Frantz et al.

[11] Patent Number: 5,802,169
[45] Date of Patent: Sep. 1, 1998

[54] SYSTEM AND METHOD FOR TRANSMISSION SYSTEM AUTOMATIC IMPEDANCE MATCHING

[75] Inventors: Robert H. Frantz, Plano; John C. Honeycutt, Dallas, both of Tex.

[73] Assignee: InterVoice Limited Partnership, Reno, Nev.

[21] Appl. No.: 629,840

[22] Filed: Apr. 11, 1996

[51] Int. Cl.$^6$ .................. H04M 7/04; H04B 1/38
[52] U.S. Cl. .......... 379/398; 379/394; 379/399; 379/402; 375/222
[58] Field of Search .................. 379/398, 394, 379/399, 402, 283, 67, 88, 386; 375/220, 222

[56] References Cited

U.S. PATENT DOCUMENTS

| | | | |
|---|---|---|---|
| 5,396,553 | 3/1995 | Haughton et al. | 379/398 |
| 5,442,694 | 8/1995 | Chitrapu et al. | 379/386 |
| 5,459,440 | 10/1995 | Claridge et al. | 379/398 |
| 5,479,498 | 12/1995 | Brandman et al. | 379/386 |
| 5,506,868 | 4/1996 | Cox et al. | 379/398 |
| 5,519,755 | 5/1996 | Meyer | 379/398 |
| 5,598,467 | 1/1997 | Bremner et al. | 379/398 |
| 5,623,514 | 4/1997 | Arai | 379/398 |

*Primary Examiner*—Ahmad F. Matar
*Assistant Examiner*—Jacques Saint-Surin
*Attorney, Agent, or Firm*—Fulbright & Jaworski L.L.P.

[57] ABSTRACT

A system and method having automatic selection of impedance values for matching against unknown line impedances. The method stores an expected set of desired return loss measurements at given frequencies and matches the calculated set against the actual measured return losses to arrive at a close approximation of the line impedance. The system is then adjusted based upon this determined close approximation. The starting point for the stored set are standard models established for each network. In situations where the actual varies greatly from the predicted, a different model is selected and the expected scores for that model are used.

14 Claims, 2 Drawing Sheets

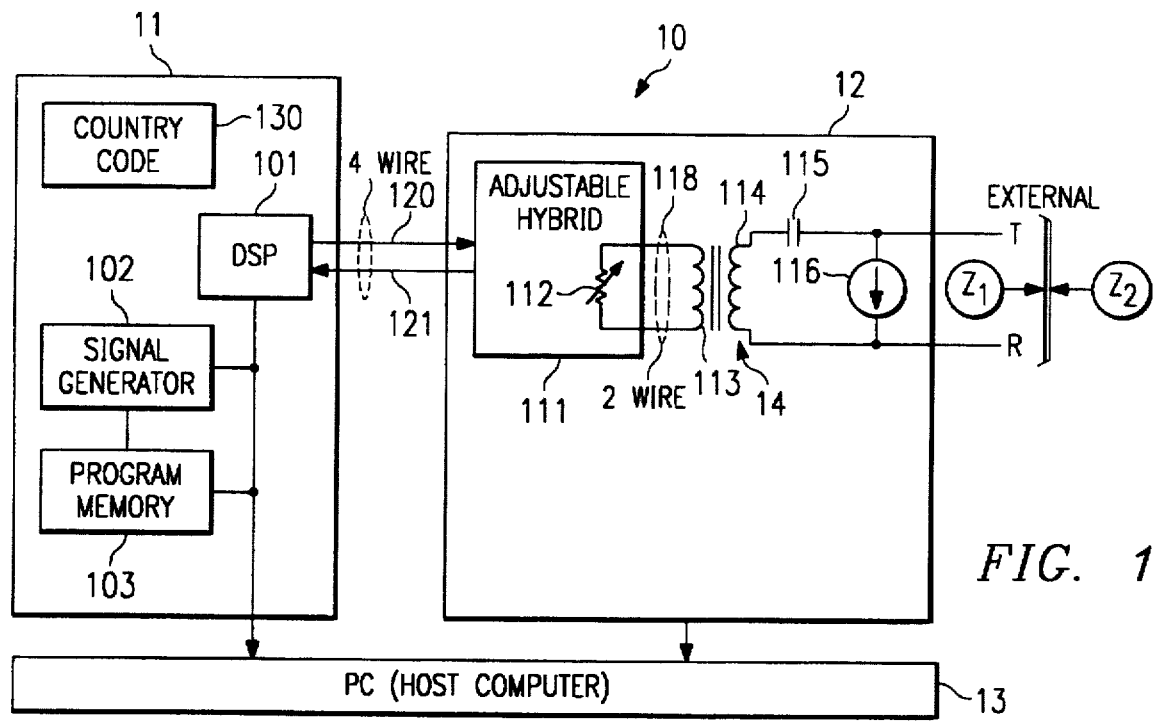
*FIG. 1*
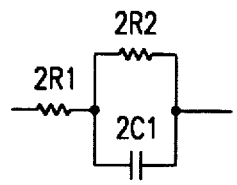
*FIG. 2A*
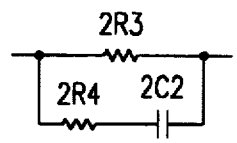
*FIG. 2B*
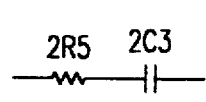
*FIG. 2C*
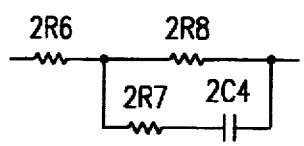
*FIG. 2D*
$$RL = 20 \log \left| \frac{Z_1 + Z_2}{Z_1 - Z_2} \right|$$
*FIG. 3*

SYSTEM AND METHOD FOR TRANSMISSION SYSTEM AUTOMATIC IMPEDANCE MATCHING

TECHNICAL FIELD OF THE INVENTION

This invention relates to a transmission system impedance matching system and method and more particularly to such a system and method for automatically determining the unknown impedance of a subscriber loop and correcting for mismatches.

BACKGROUND OF THE INVENTION

It is often necessary to interface an analog telephone device, such as a PBX, voice mail system or Voice Response Unit (VRU) with an analog telephone network having unknown impedance. To compound the problem further, the impedance model of the network may be unknown and even if known may not be accurate for a particular connection.

Ideally, of course, it is desirable (and in some situations very critical for decent performances) to have a proper match between the impedance of the connecting device and the impedance of the telephone network. Such a situation yields the loudest possible message to be delivered over the network, with the least amount of reflection to the system producing the message. This further yields the highest possibility for properly detecting DTMF and call progress tones such as a dial tone or busy tones from the telephone network or from a caller. The corollary to this is that with extreme impedance mismatched speech signals can be interpreted by the system as DTMF input from the caller (Talk off) and mismatched speech signals block the correct detection of DTMF Digits (key over) and cause operational problems. A further problem caused by impedance mismatch is that the system is trying to detect DTMF signals that are sent by the person on the far end of the telephone line (the caller), and the impedance mismatch causes much of the received DTMF energy to be reflected back to the telephone network thereby reducing the power level of the received signal at the system which, in turn, reduces the capability of the system to detect the proper digits.

In systems of the type we are discussing, it is necessary to have a 2 to 4 wire converter, or hybrid circuit, at the system network interface. It is known in the art how to automatically optimize the 2 to 4 wire hybrid performance. For example, a device called a Dual Subscriber Line Access Circuit (DSLAC) from Advanced Micro Devices can automatically adjust to reflected noise and maximize the 2 to 4 wire hybrid performance. The overall performance achieved is still severely limited by the impedance match between the system's analog interface circuit and the telephone lines to which the circuits are connected. There remains the problem of finding an easy and automatic method to determine the proper line impedance so as to be able to optimize the impedance match between the analog circuit board and the analog telephone wires, a solution to which is the subject of the present invention.

In operation, in order for the DSLAC to function properly, it must have provided to it externally the impedance of the line. This impedance is provided as a model however, and in many cases, the model is not accurate to a particular line. Thus without further input, the DSLAC will optimize for a given network model which is not accurate for the actual existing line. The biggest problem is finding the actual impedance of the telephone line, which can be a very difficult task and can require a lot of expertise to accomplish. Sophisticated and expensive test equipment is required to determine the proper impedance for a particular installation site, and this is not timely to set up and execute.

Another problem exists in that, from country to country around the world, the telephone line impedances are different and can even be different for different parts of a city. Thus, the circuit that is used must either be able to be modified at installation time, or some decision must be made as to what the impedance is on a particular telephone line so that the proper circuit could be chosen. To further compound the problem, the actual impedance of the telephone line to which the system is connected may change over time, thereby degrading system performance even after it was optimized at the time of installation.

One resulting situation is that as companies install their systems in different countries and networks around the world, they maintain different stockpiles of equipment tuned to different impedances for different networks. This adds to the costs and inflexibility of their system and limits their ability to respond to needs as they change.

SUMMARY OF THE INVENTION

These and other objects and features are achieved in our system and method in which a normal voice response unit, PBX, or voice mail system is enabled to allow it to measure the impedance of a connected telephone line without external test equipment or manual intervention and to adjust its analog interface circuit to match that impedance. The system operates with an analog circuit card which has a controllable impedance so that it can adjust the impedance that it presents to the network for optimum performance. First, the impedance is set to a well-known impedance, such as 600 ohms, which has been measured and characterized. Assuming the impedance of the network was also 600 ohms, then the response from the network would follow a known pattern. Thus, if the response, as measured, were to be different from the model of 600 ohms, then that difference would be accountable only due to the network being different from 600 ohms.

The first step is to solve for the unknown network impedance by emitting either a white noise, broadband noise, or single frequency tone from the system to the telephone line and then measuring the reflected energy at various frequencies. Using this approach would require solutions to multiple simultaneous equations which can be a tedious task.

A variation of this procedure, and a preferred method, starts with the base assumption that the model of the telephone lines supplied by either the manufacturer of the telephone lines or the telephone network operator jurisdiction) is an accurate topology and only the actual values of the components within that topology have varied. An assumption can be made of a 10% variance or a 15% or a 20% variance, whatever seems to work for the situation. Using this approach, precalculations are made at several frequencies for 10% variance, 15% variance, and 20% variance. These may be stored in memory. Then, actual calculations are made at the same frequencies for each of the same variances. The actual results are matched against the precalculated results to determine the best match. Using this match, the adjustable hybrid can be set to optimize the system.

In order to make the measurements in either method, it is necessary to emit a tone and measure the reflected energy. Emitting the tone can be done with several methods, either digitized tones in a read-only memory, or a signal generator of a single frequency, or a wideband white noise signal generator. The measurement of the reflected tone is the more difficult part which is solved by using a digital signal processor (DSP) which is normally resident in a PBX, VRU, or voice mail system. Thus, the system only relies on hardware components that already exist, with the addition of a DSP bandpass filter and some computing power, such as either a stand-alone PC or a processor built into the system directly.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. By way of one example, this method could be applied to the aforementioned expensive test equipment to reduce the cost of the equipment.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a block diagram of the system and method of our invention;

FIGS. 2A, 2B, and 2C show possible impedance models for different telephone networks;

FIG. 2D shows an impedance model which can be used to represent a combination of all three;

FIG. 3 is a return loss calculation;

DESCRIPTION OF THE PREFERRED EMBODIMENTS

Figure 4:
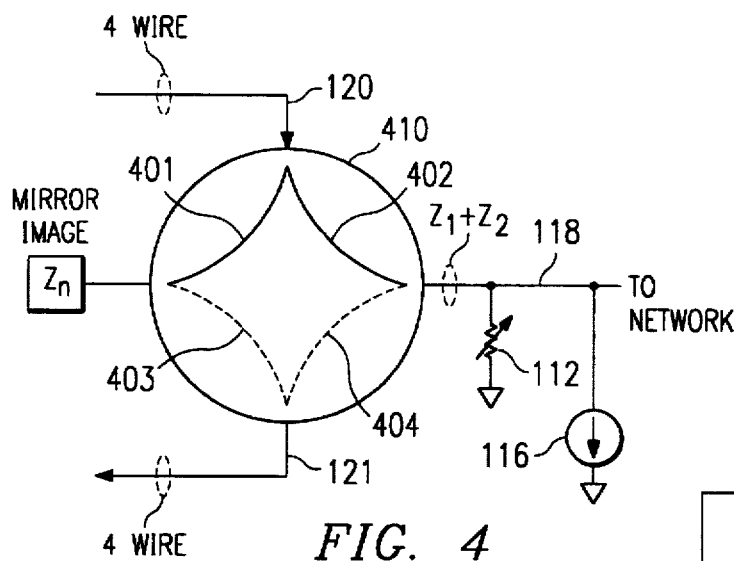
FIG. 4 shows an alternate method of representing the power transfer characteristics of an interface device.

Turning now to FIG. 1, circuit 10 shows one system of the preferred embodiment. Z2 represents the impedance presented by the network telephone lines. Z1 represents the impedance presented by the device interface analog circuit 12, which is the combined impedance looking at the device between the tip and ring (T&R) connections. Circuit 12 is representative of interface circuits, all of which are well-known in the art.

Circuit 116 is a DC current source which serves as a loop holding circuit and is well-known in the art. Capacitor 115 is a DC blocking capacitor which allows only the voice-band signals to pass to transformer primary winding 114 of transformer 14 which is a voice coupling isolation transformer. Winding 113 is the secondary side of transformer 14. Circuit 111 is an adjustable hybrid circuit including a CODEC or analog-to-digital and digital-to-analog converter circuit, and circuit 112 shows the adjustable impedance.

Four-wire lines 120 and 121 connect hybrid 111 with DSP 101 of device 11, which device is responsible for voice signal processing. Element 101 performs DTMF detection as well as voice playback. Circuits 102 and 103 show the signal generator necessary to create the single tone frequency signals and/or the white noise signals used to generate the stimulus for the return loss measurements.

Element 13 is a host computer, which can be a personal computer, and in this embodiment houses circuits 11 and 12 of system 10. In operation, a caller (not shown) is connected to a switching network (not shown), such as the public switching network, and then the switching network connects the caller to system 10 via the T&R leads.

During normal operation of the system, messages and menus are played to the caller over the telephone line represented by Z2. The messages are played under control of host computer 13 by sending data to the DSP 101, which data is then sent via path 120 to hybrid 111 which is then added to the signal on the 2-wire side 114 of transformer 14. During installation or maintenance, adjustable impedance 112 may be changed under command from host computer 13 and/or DSP 101.

The problem arises when impedance Z1 and impedance Z2 of the telephone lines do not match. Part of the energy is reflected back into the analog interface circuit. This reflection magnitude is not equal for all frequencies. When the caller at the far end presses a touch tone or DTMF key on the telephone set, energy attempts to pass from the telephone line Z2 to analog interface circuit Z1 and through transformer 14 and via hybrid circuit 111 (where that it would be digitized) and then via path 121 to DSP 101 where it would then be processed to detect the DTMF tone. If impedance Z1 and Z2 are not closely matched, part of the energy traveling from the telephone lines is reflected back to the caller and is not transferred to the analog circuit interface, thereby reducing the power of the signal that reaches the DSP for analysis. The combined effect of the two problems, i.e. the reflected power of the outgoing message coupled with the reduced incoming power of the incoming DTMF tones, makes it very difficult to properly detect the incoming DTMF tones.

Another way to look at this reflection mismatch is shown in FIG. 4 where circle 410 it is symbolic representation of the flow of the data. In the representation, inbound signals on 4-wire path 120 enter circle 410 (top) and in the ideal situation would follow a balanced split along lines 401 and evenly and would have no leakage via lines 403 or 404 to the 4-wire outbound path 121. The 2-wire impedance at the input to circle 410 (right) is shown as Z1+Z2, which is a combination of the 2-wire impedance in the network as well as the local system. The mirror image impedance is ZN (left) and in the ideal situation should match exactly Z1+Z2. When that condition exists there is no leakage of signal 120 in either 403 or 404.

As discussed with respect to FIG. 1, adjustable hybrid 111 under command from host computer 13 or DSP 101 has the capability of adjusting variable impedance 112 to compensate for theoretically known impedance Z2 of the network. However, also as discussed, this theoretical impedance can be inaccurate. Thus, it is necessary to establish Z1+Z2 by changing element 112 so that it would exactly (or as close as possible) match the mirror image ZN, therefore maximizing the power transfer.

Turning now to FIGS. 2A through 2C, there are shown three different standard impedance models used by various telecommunications networks around the world. These are ideal models and the actual models may vary. In addition, the various values of the elements, such as elements 2R1, 2R2, 2C1 in FIG. 2A, can themselves vary in various proportions. FIG. 2B shows a combination of resistor 2R3 in parallel with the series combination of resistor 2R4 and capacitor 2C2, whereas in FIG. 2C there is simply resistor 2R5 in series with capacitor 2C3. These three models are not the only models but are representative of three of the widest used models for the various jurisdictions around the world. FIG. 2D is a combination of FIGS. 2A, 2B and 2C.

FIG. 3 shows the return loss calculation as a result of sending out a signal from DSP 101 (FIG. 1) and measuring the return loss. This would be 20 times the log of the absolute value of Z1 plus Z2, divided by Z1 minus Z2. This calculation, as will be seen, will be used to determine the return loss in the actual and theoretical situations.

Figure 5:
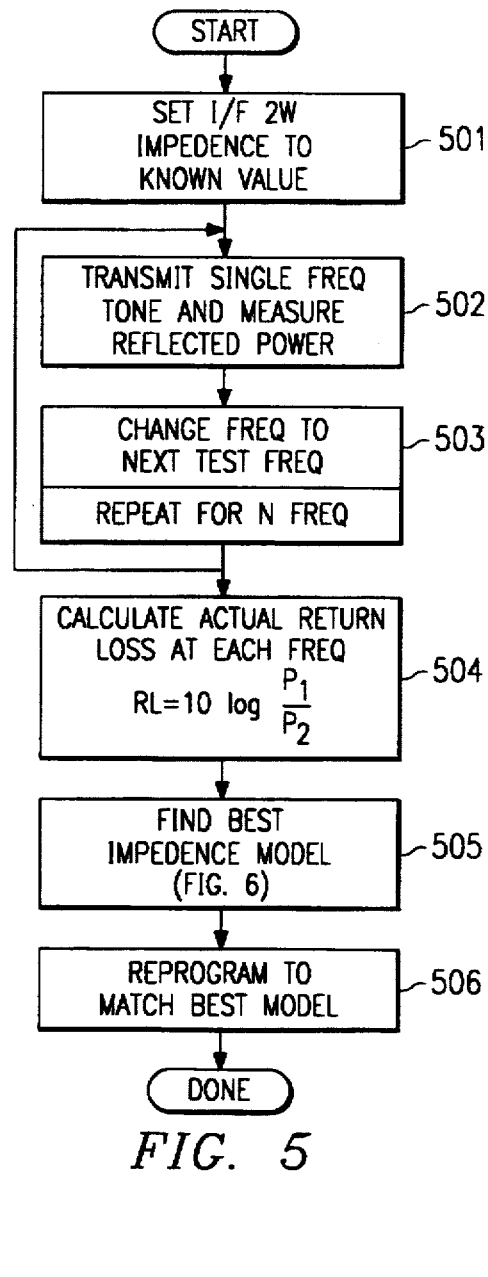
FIGS. 5 and 6 show the preferred method of establishing the proper impedance method.

Turning now to FIG. 5, in step 501 the process is started with a well-known impedance programmed to the analog line interface circuit 12 (FIG. 1). That would normally be set to purely resistive 600 ohms in the preferred embodiment. To achieve a 600 ohms value for Z1, the system programs adjustable impedance 112 (FIG. 1) to combine with the impedances of elements 113, 115, and 116 to yield the effective result of 600 ohms. Then there is transmitted a series of tones via boxes 502 and 503, each tone being a single test frequency. After transmitting each tone, the reflected power at that frequency is measured. In a voice telephony application, frequencies would be used in the band range of the transmission media, which typically would be 200 Hz to 3800 Hz. Optimally, there would be several selected frequencies which are not multiples of each other, i.e. not 500, 1000, 1500, and 2000 Hz, but something more like 700, 1200, 1800, 1700, 2100 Hz, thereby avoiding harmonics of each other as much as possible.

The system then calculates an actual return loss measurement for each frequency as the ratio of the power at the frequency transmitted, divided into the power that is received due to reflection. This equation is shown in step 504 for each frequency. Then that set of return loss measurements at each frequency is passed into step 505, where the best impedance model that would match those measurements is selected by finding the best match between expected and actual return loss values. At the conclusion of step 505, a best impedance model with the best component values in that model has been selected and the system is reprogrammed via step 506 to match that impedance, replacing the known value which is programmed in 501. At that point, the line interface performance is optimum.

In order to reprogram circuit 10 (FIG. 1), PC 13 sends new data to DSP 101 which then passes that data to adjustable hybrid 111 which in one embodiment can be an AMD Dual Subscriber Line Access Circuit.

Figure 6:
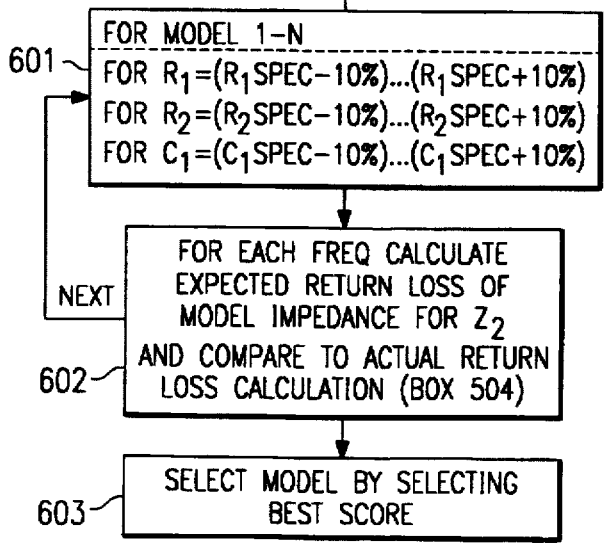

Continuing now in FIG. 6, there is shown multiple nested loops in the preferred embodiment where the impedance value of each element in each model is varied by plus and minus 10%. This is shown in step 601. For example, a model that has three elements (resistor R1, resistor R2, and capacitor C1) would have each element varied. Starting from the specified value, given by the manufacturer of the telephone lines or the network operator of the telephone lines for each one of those components, the algorithm varies those values by plus or minus 10%, trying each combination of R1, R2 and C1 with each other and then calculating the expected return loss measurement at each frequency in step 602. By using the model of FIG. 2D, one set of equations can be used to search for a match to models 2A, 2B, and 2C simply by allowing resistors to take 0 ohm values, very large values, and +/- 10% nominal values to emulate the other models.

The actual measurement at each frequency from step 504 of FIG. 5 is compared to the expected return loss with this combination of R1, R2 and C1 for this particular model. If it matches well, a high score is associated therewith, and if it does not match well, then a low score would be associated therewith. As all values of R1, R2 and C1 are tried for all combinations of all models shown in examples FIG. 2A, 2B and 2C the match with the component values with the best score is selected at the end of the process, which is step 603.

Step 602 can either be calculated at the time of installation or maintenance for on-site calibration, or the expected values could be simply precalculated and loaded into a table such as program memory 103 (FIG. 1). The preferred embodiment would be for the data to be stored in memory 103 (FIG. 1), to save computation and installation time at the time of calibration. Country Code 130 can be used to select the proper data from memory 103. Country Code 130 can be set by switches (not shown) or by a data bus and register (not shown). In addition, once a system is found to be operational, the parameters can be stored and later selected, without the need for determining the best match. Also, when a system goes out, or periodically under timer control or otherwise, the system can recalibrate to establish proper impedance matching.

Although the present invention and its advantages have been described in detail, it should be understood that various changes, substitutions and alterations can be made herein without departing from the spirit and scope of the invention as defined by the appended claims.

What is claimed is:

1. A method under the control of a processor, for automatically matching the impedance of an analog telecommunications interface circuit with the impedance of an actual telecommunications line, the impedance of which is unknown, said method comprising the steps of:

selecting an impedance model which is anticipated to fit the impedance model of said telecommunications line;

performing a number of return loss measurements at a selected number of frequencies;

matching the measurements obtained from said performing step against a set of calculated expected values at the same frequencies and using said selected impedance model; and adjusting said analog telecommunications interface circuit in accordance with the results of said matching step.

2. The method set forth in claim 1 wherein said matching step includes the step of:

matching the measurements obtained by said performing step against a number of different groups of precalculated return loss measurements, each group resulting from calculations made using said same frequencies but using a variation in impedance value of a particular element of said assumed impedance model to obtain the group which most closely approximates said obtained measurements.

3. The method set forth in claim 2 wherein said precalculations are performed substantially concurrently with said measurements.

4. The method set forth in claim 2 wherein said precalculations are made for different assumed impedance models, and wherein each said assumed impedance model includes a plurality of said groups resulting from calculations made using said same frequencies but using a variation in impedance value of a particular element of said assumed impedance model, said precalculations for each said impedance model stored in a memory associated with said hybrid.

5. The method set forth in claim 4 wherein said impedance model selecting step includes the step of selecting a code associated with an impedance model.

6. The method set forth in claim 5 wherein said last-mentioned code selecting step includes the step of setting a value in a register.

7. The method set forth in claim 1 wherein said hybrid is connected to a digital signal processor (DSP) and wherein said return loss measurements are controlled in part by said DSP.

8. The method set forth in claim 1 wherein said hybrid is connected to a voice processing unit containing a digital signal processor (DSP) and wherein said return loss measurements are controlled, at least in part, by said DSP.

9. The method set forth in claim 1 wherein said measurement matching step includes the step of:

assigning a closeness number to matches for different sets of calculations and then selecting which calculation set has the closest match to the obtained measurements.

10. The method set forth in claim 1 wherein said selected impedance models are represented by a single, combined equivalent model.

11. In a telecommunications system wherein calling parties can be connected to response circuit through a switched network, the improvement comprising:

means for automatically matching the transmission characteristics of the calling network connection to the transmission characteristics of the response circuit, said means including:

means for selecting a transmission model for said response circuit which is anticipated to fit the transmission model of said calling network;

means for performing a number of return loss measurements of said calling network connection at a selected number of frequencies;

means for matching the measurements obtained from said performing means against a set of calculated expected values at the same frequencies and using said selected transmission model; and means for adjusting said transmission characteristics of said response circuit under control of said matching means.

12. The system set forth in claim 11 wherein said adjusting means includes:

means for matching said measurements obtained by said performing means against a number of groups of precalculated return loss measurements, each group having different transmission characteristics to obtain a group which most closely approximates said obtained measurements.

13. The system set forth in claim 12 wherein said precalculated return loss measurements are performed substantially concurrently with said return loss measurements.

14. The system set forth in claim 12 wherein said precalculated return loss measurements are stored in a memory prior to connection of said response circuit to said network.

* * * * *